(12) United States Patent
Ajioka et al.

(10) Patent No.: US 7,663,629 B2
(45) Date of Patent: Feb. 16, 2010

(54) COLLISION DETERMINATION PROGRAM AND COLLISION DETERMINATION APPARATUS

(75) Inventors: Yoshitaka Ajioka, Kyoto (JP); Kiyoshi Mizuki, Kyoto (JP)

(73) Assignee: Nintendo Co. Ltd., Kyoto (JP)

( * ) Notice: Subject to any disclaimer, the term of this patent is extended or adjusted under 35 U.S.C. 154(b) by 532 days.

(21) Appl. No.: 11/300,337

(22) Filed: Dec. 15, 2005

(65) Prior Publication Data
US 2006/0200314 A1 Sep. 7, 2006

(30) Foreign Application Priority Data
Mar. 2, 2005 (JP) .............. 2005-057658

(51) Int. Cl.
*G06T 13/00* (2006.01)
*G06T 15/70* (2006.01)
*G06T 15/00* (2006.01)
*G06F 7/60* (2006.01)
*G06G 7/48* (2006.01)
*G06F 17/10* (2006.01)

(52) U.S. Cl. .............. 345/473; 345/474; 345/958; 703/2; 703/6; 703/7; 703/8

(58) Field of Classification Search ............ 345/418, 345/619, 642, 473–474, 958; 463/33; 703/2, 703/6–8
See application file for complete search history.

(56) References Cited

U.S. PATENT DOCUMENTS

| | | | | |
|---|---|---|---|---|
| 3,095,560 A | * | 6/1963 | Castellini | 342/30 |
| 5,056,031 A | * | 10/1991 | Nakano et al. | 701/301 |
| 6,563,503 B1 | * | 5/2003 | Comair et al. | 345/473 |
| 6,862,026 B2 | * | 3/2005 | Zachmann | 345/474 |
| 7,146,297 B2 | * | 12/2006 | Marshall et al. | 703/6 |
| 2002/0149603 A1 | * | 10/2002 | Frisken et al. | 345/630 |
| 2002/0154128 A1 | * | 10/2002 | Zachmann | 345/474 |

FOREIGN PATENT DOCUMENTS

| | | |
|---|---|---|
| JP | 7-152807 | 6/1995 |
| JP | 7-230559 | 8/1995 |
| JP | 10-165648 | 6/1998 |
| JP | 2001-321562 | 11/2001 |
| JP | 2003-251068 | 9/2003 |
| JP | 2004-334802 | 11/2004 |

OTHER PUBLICATIONS

Notice of Reasons for Rejection: Issue Date: Feb. 20, 2009. Application No. JP 2005-057658.

* cited by examiner

*Primary Examiner*—Ulka Chauhan
*Assistant Examiner*—Crystal Murdoch
(74) *Attorney, Agent, or Firm*—Nixon & Vanderhye P.C.

(57) ABSTRACT

A collision determination area set for a dog as an object in a virtual three-dimensional space is, for example, a sphere having the center at the chest of the dog and having a radius of 30 in the "on all fours" state, a sphere having the center at the hip of the dog and having a radius of 10 in the "standing" state, and a sphere having the center at the head of the dog and having a radius of 10 in the state of the dog "trying to fawn with another dog" in the virtual three-dimensional space. Using the collision determination area set in this manner, it is determined whether or not the dog has collided against another object. Therefore, a collision determination suitable to individual situations can be realized while suppressing an increase in the amount of calculations required for the collision determination.

12 Claims, 12 Drawing Sheets

FIG. 7

| COLLISION DETERMINATION AREA TABLE 44 ||| 
|---|---|---|
| STATE OF, OR AROUND, THE DOG | COLLISION DETERMINATION AREA ||
| | CENTER POSITION | RADIUS |
| A: ON ALL FOURS | CHEST | 30 |
| B: STANDING | HIP | 10 |
| C: SITTING | CHEST | 20 |
| D: TRYING TO FAWN WITH ANOTHER DOG | CHEST | 10 |
| E: HOLDING A FRISBEE IN HIS MOUTH | HEAD | 40 |
| F: TRYING TO PASS THROUGH A NARROW PASSAGE | CHEST | 10 |

COLLISION DETERMINATION PROGRAM AND COLLISION DETERMINATION APPARATUS

CROSS REFERENCE OF RELATED APPLICATION

The disclosure of Japanese Patent Application No. 2005-057658 is incorporated herein by reference.

BACKGROUND OF THE INVENTION

1. Field of the Invention

The present invention relates to a technology for making a determination on a collision of objects in a virtual space displayed as a two-dimensional image.

2. Description of the Background Art

There are technologies for making a determination on a collision of three-dimensional objects in a virtual three-dimensional space. According to such technologies, the three-dimensional objects are approximated to spherical or other cubic shapes, and it is determined whether the three-dimensional objects have collided against each other or not based on whether the approximate cubic (for example, spherical) shapes overlap or not. Such technologies can reduce the amount of calculations required for a collision determination as compared to a method of using shapes accurately reflecting the objects.

Japanese Laid-Open Patent Publication No. 10-165648 describes a technology of approximating objects to an elliptic spherical surface body. Japanese Laid-Open Patent Publication No. 7-152807 describes a technology of approximating objects to a spherical shape to perform rough checking and then approximating objects which have a possibility of interfering with each other to at least one fundamental cubic shape to perform precise checking. Japanese Laid-Open Patent Publication No. 7-230559 describes a technology of approximating objects to a great number of different spherical shapes.

The technology described in Japanese Laid-Open Patent Publication No. 10-165648 occasionally makes a determination on a collision more precisely than the technology of approximating the objects to a simple spherical shape, but often cannot make an appropriate determination on a collision due to certain conditions. The technology described in Japanese Laid-Open Patent Publication No. 7-152807 requires precise checking in addition to rough checking, which increases the amount of calculations. The technology described in Japanese Laid-Open Patent Publication No. 7-230559 requires a determination on a collision to be made on a great number of different spherical shapes for one object, which increases the amount of calculations.

SUMMARY OF THE INVENTION

Therefore, an application of the present invention is to realize a collision determination suitable for individual situations while suppressing an increase in in the amount of required calculations.

The reference numerals, figure numbers, additional explanations and the like in parentheses in this section of the specification indicate the correspondence with the embodiment described later for easier understanding of the present invention, and do not limit the present invention in any way.

A first aspect of the present invention is directed to a computer-readable storage medium having a collision determination program stored thereon for determining whether or not a first object (dog A) and a second object (dog B) have collided against each other in a virtual space displayed by display means (12). The collision determination program (41) causes a computer (21) to execute an updating step (S12), a first setting step (S16), a second setting step (S16), and a collision determination step (S22). The updating step updates position information (51) of the first object or the second object stored in storage means (24). The first setting step sets a collision determination area (FIG. 8A through FIG. 8F), for the first object, which has a shape different from the shape of the first object and has a size and/or a position different in accordance with a state of the first object or a state around the first object (states A through F in FIG. 7). The second setting step sets a collision determination area for the second object. The collision determination step determines whether or not the first object and the second object have collided against each other by determining whether or not the collision determination area set for the first object in the first setting step and the collision determination area set for the second object in the second setting step overlap each other. The virtual space may be two-dimensional or three-dimensional. The first object and the collision determination areas may be two-dimensional or three-dimensional. The collision determination area may be, for example, spherical, rectangular parallelepiped, or elliptical. For the first object, one collision determination area may be set or a plurality of collision determination areas may be set. The "position" of the collision determination area for the first object is a position relative to the first object. The collision determination area for the second object may have a different shape from the shape of the second object, or the exact shape of the second object may be used as the collision determination area for the second object.

In a second aspect based on the first aspect, the collision determination area set for the first object in the first setting step has a shape simpler than the shape of the first object.

In a third aspect based on the first aspect, the collision determination area set for the first object in the first setting step is formed of one sphere.

In a fourth aspect based on the first aspect, the collision determination area set for the first object in the first setting step is different in the size and/or the position in accordance with whether the first object (dog A) and a third object (Frisbee (trademark)) are combined with each other (state E in FIG. 7, FIG. 8E) or not (FIG. 8A). The state in which the first object and the third object are "combined with each other" refers to a state in which the first object and the third object exist in an integral manner while being in contact or in connection with each other.

In a fifth aspect based on the fourth aspect, the collision determination area set for the first object in the first setting step includes at least a part of the third object when the first object and the third object are combined with each other (FIG. 8E).

In a sixth aspect based on the first aspect, the collision determination area set for the first object in the first setting step is smaller when the first object is permitted to contact another object (state D in FIG. 7, FIG. 8D) than when the first object is not permitted to contact another object (FIG. 8A). The expression "permitted to contact another object" refers to "permitted to approach another object closer than usual". For example, in the case where the first object is a dog, this expression refers to a state in which the dog is trying to fawn with another dog.

In a seventh aspect based on the first aspect, the collision determination area set for the first object in the first setting step is different in the size and/or the position in accordance with a current position of the first object or the positional relationship between the first object and another object.

In an eighth aspect based on the first aspect, the first setting step includes a step of reading a reference collision determination area for the first object which is set with a predetermined size and at a predetermined position from the storage means, and a step of changing the size and/or the position of the read reference collision determination area in accordance with the state of the first object or the state around the first object. The step of changing may change the size and/or the position of the reference collision determination area by referring to a table, which defines a change amount in the size and the position of the collision determination area (a change amount from the reference collision determination area) for each of the conceivable states of the first object or each of the conceivable states around the first object. The "change amount from the reference collision determination area" in the table may be defined numerically or by a function for obtaining the change amount.

In a ninth aspect based on the first aspect, the collision determination area is set for the first object in the first setting step by referring to a collision determination area table (44, FIG. 7) which defines the size and the position of a collision determination area for each of conceivable states of the first object or each of conceivable states around the first object. The "size and the position of a collision determination area" in the collision determination area table may be defined by the values representing the size and the position or by a function for obtaining the size and the position.

In a tenth aspect based on the first aspect, the collision determination program further causes the computer to execute a moving step (S30) and an outputting step (S34). When the first step and the second step are determined to have collided against each other in the collision determination step, the moving step further updates the position information (51) of the first object or the second object stored in the storage means, thereby moving at least one of the first object and the second object to a position at which the collision determination area for the first object and the collision determination area for the second object do not overlap each other. The outputting step generates an image including the first object and the second object by referring to the position information (51) of the first object or the second object stored in the storage means, and outputs the image to the display means.

An eleventh aspect of the present invention is directed to a collision determination apparatus for determining whether or not a first object and a second object have collided against each other in a virtual space displayed by display means. The collision determination apparatus (10) comprises the display means (12), storage means (24), updating means (21, S12), first setting means (21, S16), second setting means (21, S16), and the collision determination means (21, S22). The storage means stores position information (51) of at least the first object and the second object. The updating means updates the position information of the first object or the second object stored in storage means. The first setting means sets a collision determination area (FIG. 8A through FIG. 8F), for the first object, which has a shape different from the shape of the first object and has a size and/or a position different in accordance with a state of the first object or a state around the first object (states A through F in FIG. 7). The second setting means sets a collision determination area for the second object. The collision determination means determines whether or not the first object and the second object have collided against each other by determining whether or not the collision determination area set for the first object and the collision determination area set for the second object overlap each other.

According to the first aspect of the present invention, at least one of the size and the position of the collision determination area for the first object changes in accordance with the state of, or the state around, the first object. Therefore, an appropriate collision determination can be performed in accordance with the state of, or the state around, the first object.

According to the second aspect of the present invention, the collision determination is performed using a shape simpler than the shape of the first object. Therefore, the amount of calculations required for the collision determination can be reduced.

According to the third aspect of the present invention, the amount of calculations required for the collision determination can be significantly reduced.

According to the fourth aspect of the present invention, the collision determination area for the first object can be appropriately set in accordance with whether the first object and the third object are combined with each other or not.

According to the fifth aspect of the present invention, when the first object and the third object are combined with each other, the collision determination area for the first object is set so as to include apart of, or the entirety of, the third object. By performing the collision determination on the first object against another object using such a collision determination area, the collision determination on the third object against the another object can be omitted. Therefore, it is not necessary to separately perform a collision determination on the first object against the another object and a collision determination on the third object against the another object. As a result, the amount of calculations required for the collision determination can be reduced.

According to the sixth aspect of the present invention, an inconvenience that, for example, the first object and another object are only displayed as being separate from each other although the two objects are permitted to contact each other, can be avoided.

According to the seventh aspect of the present invention, when, for example, the first object approaches a narrow passage interposed between obstacles, the collision determination area for the first object can be appropriately set.

According to the eighth aspect of the present invention, by appropriately changing the size or the position of the reference collision determination area, substantially the same effect as that provided by the first aspect is provided.

According to the ninth aspect of the present invention, the collision determination area can be appropriately set by referring to the collision determination area table.

According to the tenth aspect of the present invention, each object can be displayed on the display screen while the positions of the objects are controlled such that the objects do not interfere with each other, based on the result of the collision determination.

These and other objects, features, aspects and advantages of the present invention will become more apparent from the following detailed description of the present invention when taken in conjunction with the accompanying drawings. Embodiments of the invention may incorporate one or more of the previously mentioned aspects of the invention.

BRIEF DESCRIPTION OF THE DRAWINGS

FIG. 7 shows an example of a collision determination area table;

DESCRIPTION OF THE PREFERRED EMBODIMENTS

Hereinafter, a structure and an operation of a game apparatus according to one embodiment of the present invention will be described.

Figure 1:
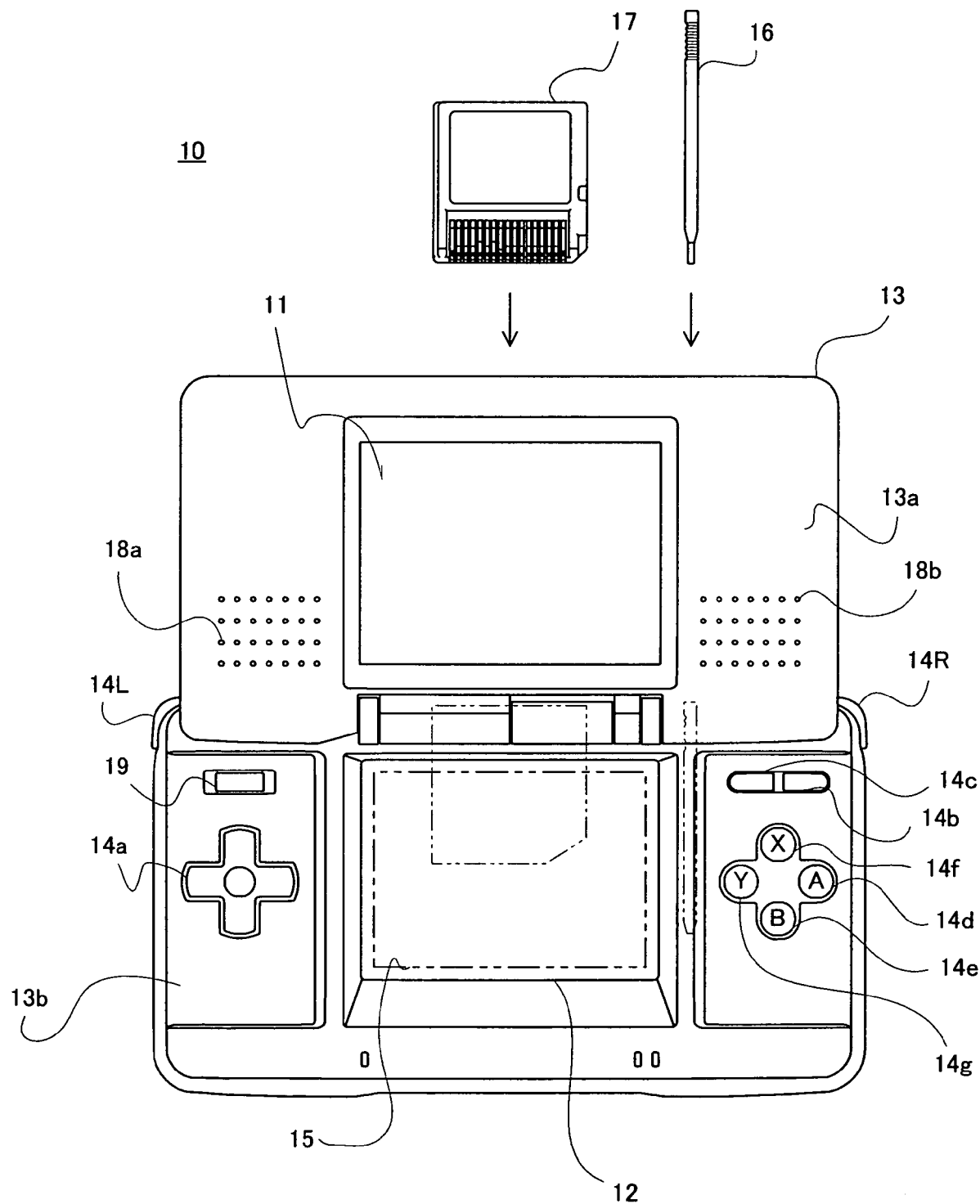
FIG. 1 is an external view of a game apparatus according to one embodiment of the present invention.

FIG. 1 is an external view of a game apparatus according to one embodiment of the present invention. In FIG. 1, a game apparatus 10 includes a first LCD (Liquid Crystal Display) 11 and a second LCD 12. A housing 13 includes an upper housing 13a and a lower housing 13b. The first LCD is accommodated in the upper housing 13a, and the second LCD is accommodated in the lower housing 13b. The first LCD 11 and the second LCD 12 both have a resolution of 256 dots× 192 dots. In this embodiment, LCDs are used as display devices, but the present invention is applicable to apparatuses using other arbitrary display devices such as EL (Electro Luminescence) devices or the like. The display devices may have any resolution.

The upper housing 13a has speaker holes 18a and 18b for releasing a sound from a pair of speakers (represented with reference numerals 30a and 30b in FIG. 2) described later.

The lower housing 13b has a cross-shaped switch 14a, a start switch 14b, a select switch 14c, an A button 14d, a B button 14e, an X button 14f, a Y button 14g, an L button 14L and an R button 14R provided thereon as input elements. A touch panel 15 is attached to a screen of the second LCD 12 as an additional input element. The lower housing 13b has a power switch 19 and insertion holes for accommodating a memory card 17 and a stick 16.

The touch panel 15 may be of any system; for example, a resistance film system, an optical (infrared) system, or a static capacitance coupling system. The touch panel 15 has a function of, when a surface thereof is touched with the stick 16, outputting coordinate data corresponding to the position of the surface touched by the stick 16. Hereinafter, the player operates the touch panel 15 using the stick 16. Alternatively, the player may operate the touch panel 15 using a pen (stylus pen) or his/her finger instead of the stick 16. In this embodiment, the touch panel 15 has a resolution of 256 dots×192 dots (detection precision) like the second LCD 12. It is not absolutely necessary that the touch panel 15 has the same resolution as that of the second LCD 12.

The memory card 17 is a storage medium having a game program stored thereon, and is detachably attachable into the insertion hole of the lower housing 13b.

Next, with reference to FIG. 2, an internal structure of the game apparatus 10 will be described.

Figure 2:
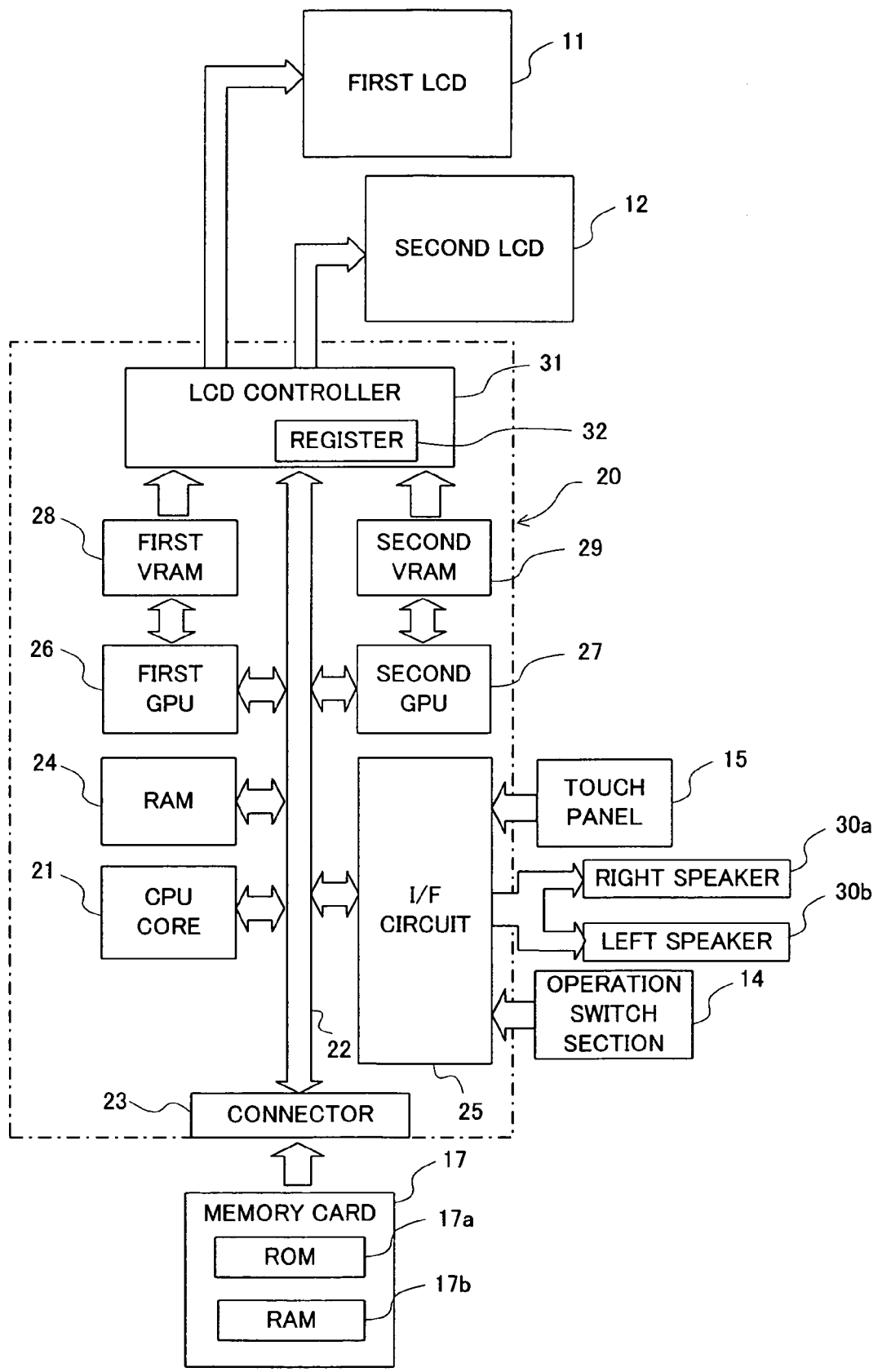
FIG. 2 is a block diagram showing an internal structure of the game apparatus according to the embodiment of the present invention.

In FIG. 2, a CPU core 21 is mounted on an electronic circuit board 20 accommodated in the housing 13. The CPU core 21 is connected to a connector 23 via a bus 22 and is also connected to an input/output interface circuit (represented as "I/F circuit" in FIG. 2) 25, a first GPU (Graphics Processing Unit) 26, a second GPU 27, a RAM 24 and an LCD controller 31. The memory card 17 is detachably connected to the connector 23. The memory card 17 includes a ROM 17a having a game program stored thereon and a RAM 17b having backup data rewritably stored thereon. The game program stored on the ROM 17a of the memory card 17 is loaded onto the RAM 24, and the game program loaded onto the RAM 24 is executed by the CPU core 21. The RAM 24 stores temporary data obtained by the execution of the game program by the CPU core 21 and data for generating game images, as well as the game program. The I/F circuit 25 is connected to the touch panel 15, a right speaker 30a, a left speaker 30b, and an operation switch section 14 including the cross switch 14a, the A button 14d and the like shown in FIG. 1. The right speaker 30a and the left speaker 30b are respectively located inside the speaker holes 18a and 18b.

The first GPU 26 is connected to a first VRAM (Video RAM) 28, and the second GPU 27 is connected to a second VRAM 29. In response to an instruction from the CPU core 21, the first GPU 26 generates a first game image based on the data for generating a game image stored on the RAM 24, and draws the first game image in the first VRAM 28. Similarly, in response to an instruction from the CPU core 21, the second GPU 27 generates a second game image and draws the second game image in the second VRAM 29. The first VRAM 28 and the second VRAM 29 are connected to the LCD controller 31.

The LCD controller 31 includes a register 32. The register 32 stores the value of "0" or "1" in accordance with an instruction from the CPU core 21. When the value in the register 32 is "0", the LCD controller 31 outputs the first game image drawn in the first VRAM 28 to the first LCD 11, and outputs the second game image drawn in the second VRAM 29 to the second LCD 12. When the value in the register 32 is "1", the LCD controller 31 outputs the first game image drawn in the first VRAM 28 to the second LCD 12, and outputs the second game image drawn in the second VRAM 29 to the first LCD 11.

The above-described structure of the game apparatus 10 is merely exemplary. The present invention is applicable to any information processing apparatus including a display device. A game program according to the present invention may be supplied to an information processing apparatus via an external memory medium such as the memory card 17 or the like, or via a wired or wireless communication line. A game program may be pre-stored on a non-volatile memory device in an information processing apparatus.

Figure 3:
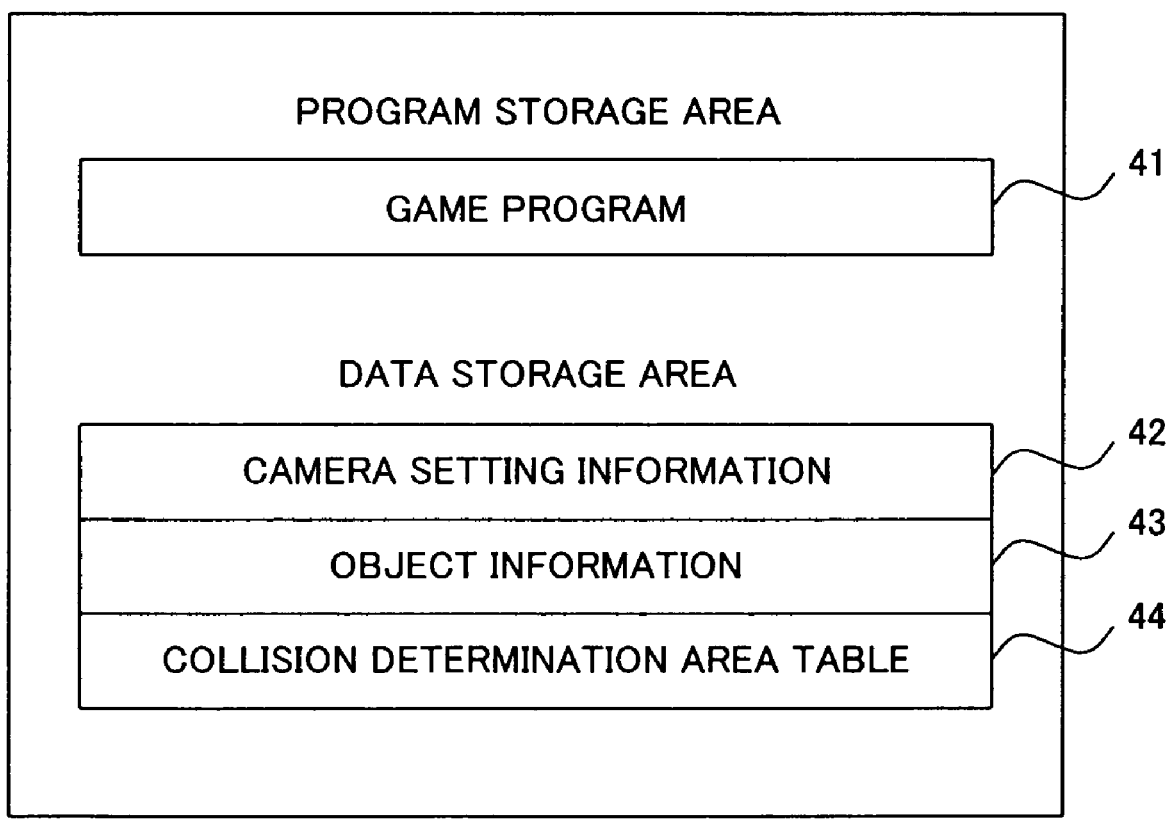
FIG. 3 shows a memory map of a RAM.

FIG. 3 shows a memory map of the RAM 24. A storage area of the RAM 24 is roughly divided into a program storage area and a data storage area.

Onto the program storage area, a game program 41 is loaded from the ROM 17*a* of the memory card 17. The game program 41 includes, for example, a program code for automatically controlling objects in a virtual three-dimensional space in accordance with a predetermined algorithm and a program code for performing collision determination processing using collision determination areas described later based on a predetermined collision determination formula.

In the data storage area, camera setting information 42, object information 43 and a collision determination area table 44 are stored.

Figure 4:
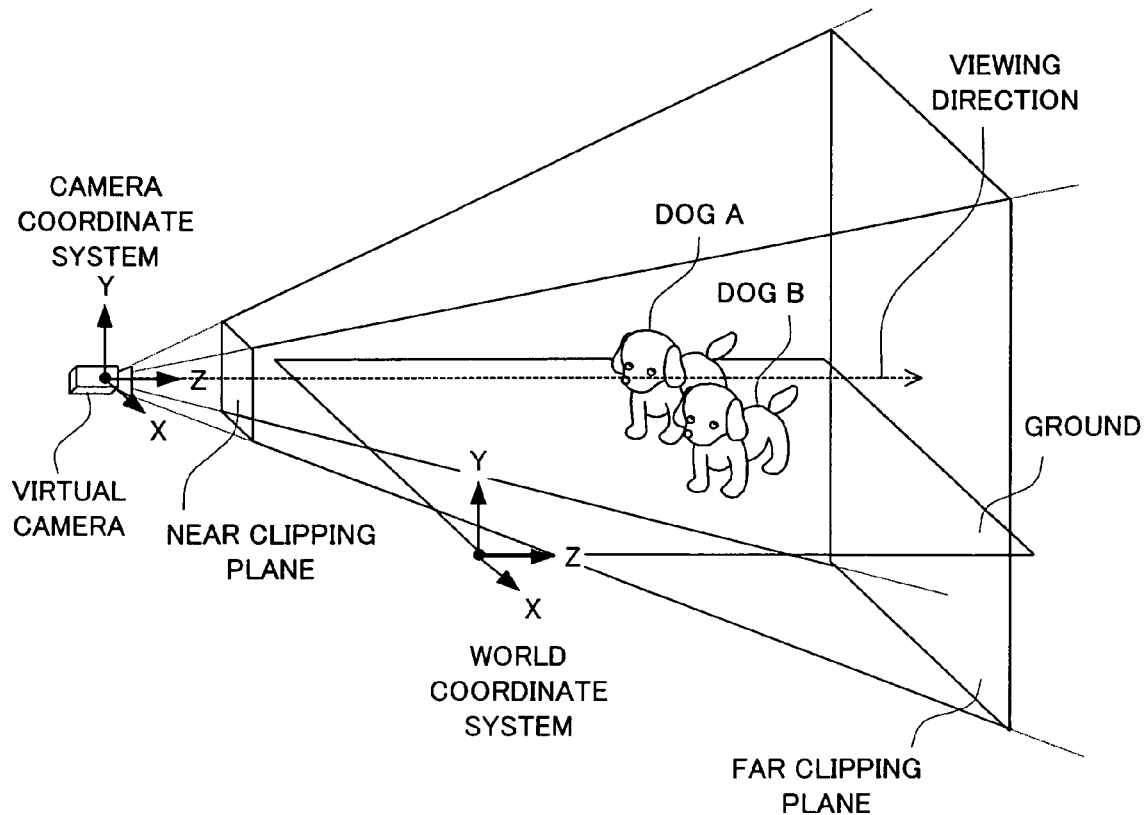
FIG. 4 shows an example of the locations of a virtual camera and objects in a virtual three-dimensional space.
Figure 5:
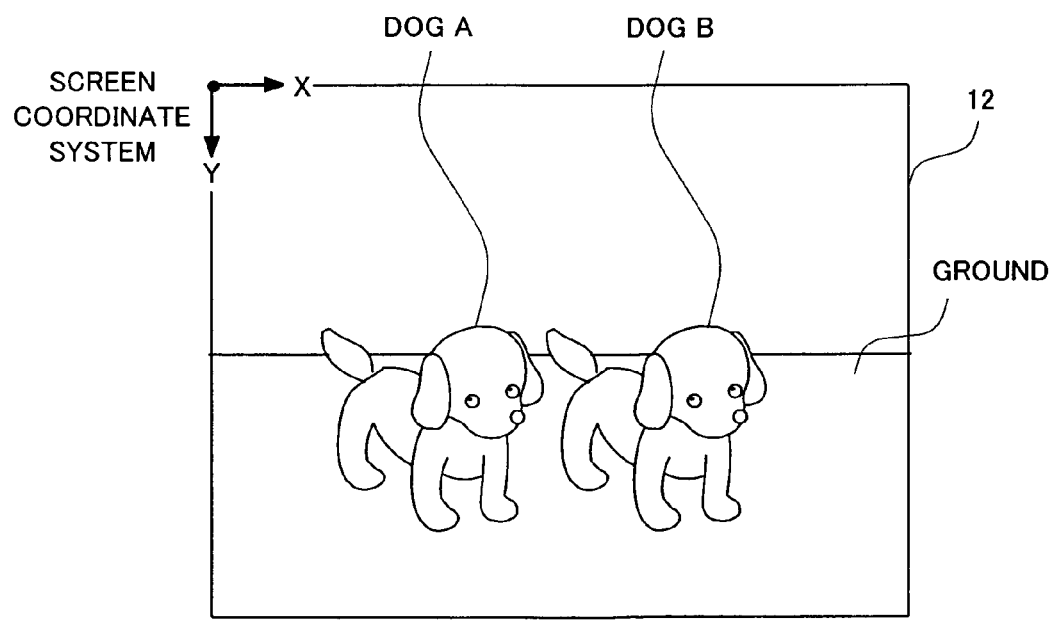
FIG. 5 shows an example of a game image displayed on a second LCD.

The camera setting information 42 includes various set values regarding a virtual camera located in the virtual three-dimensional space. Such various set values represent, for example, the location coordinates, the tilt (rotation angle), the direction (viewing direction), and the viewing angle of the virtual camera. FIG. 4 shows an example of the position at which the virtual camera is located in the virtual three-dimensional space. On the second LCD 12, objects located in the virtual three-dimensional space (in the example shown in FIG. 4, dog A, dog B and the ground) as viewed from the virtual camera are displayed as a game image. FIG. 5 shows such a game image displayed on the second LCD 12 based on the virtual camera in FIG. 4. Methods for generating an image in a virtual three-dimensional space based on a virtual camera are well-known and will not be described in detail herein. Briefly, the coordinates of apexes of an object (more accurately, the coordinates of apexes of a polygon forming the object) represented in a world coordinate system are converted into coordinates in a camera coordinate system based on the virtual camera, and are then subjected to perspective projection transformation. As a result, the coordinates of the apexes are converted into coordinates in a screen coordinate system.

Figure 6:
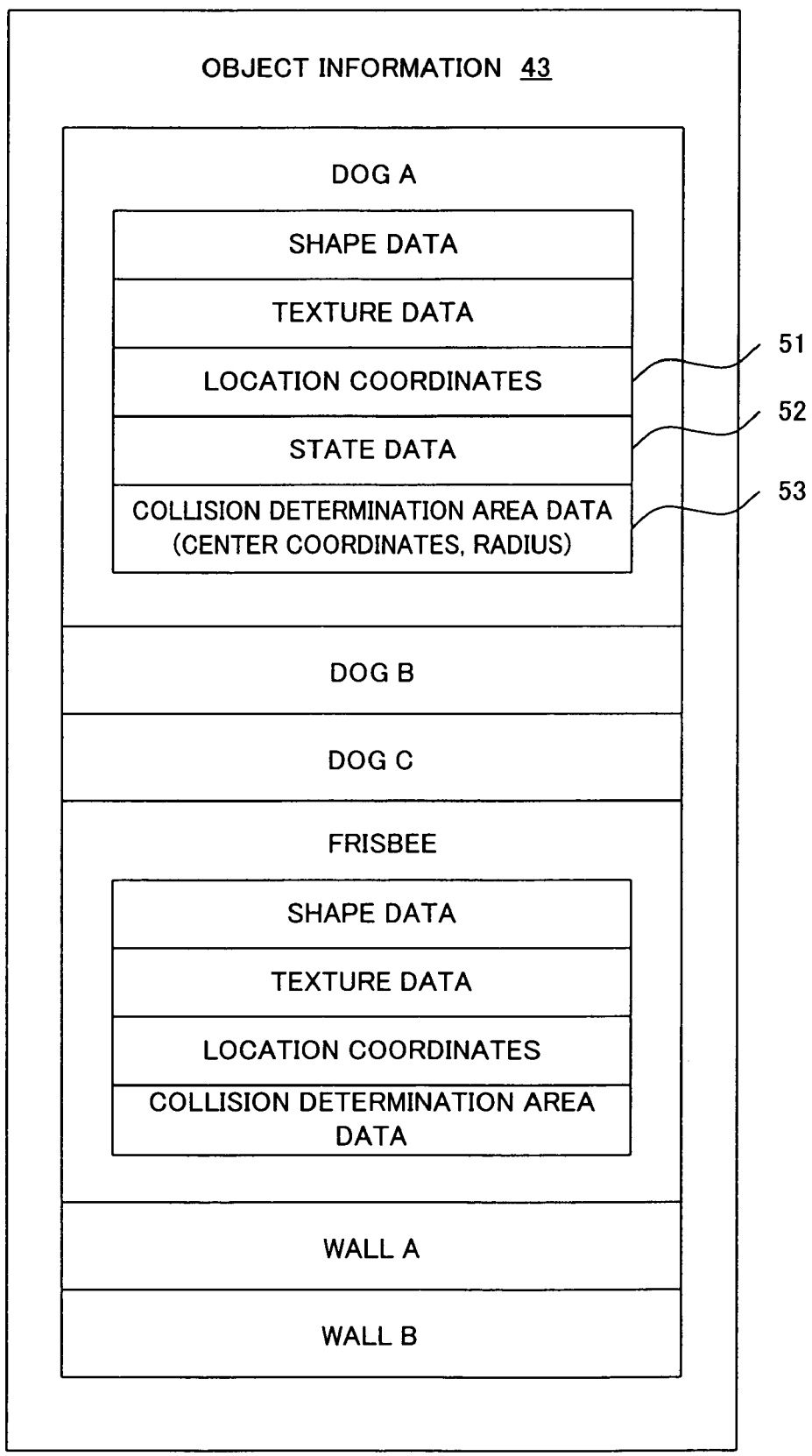
FIG. 6 shows an example of object information.

The object information 43 represents various types of information regarding the objects located in the virtual three-dimensional space. The object information 43 is shown in FIG. 6 in detail. In this embodiment, dog A, dog B, dog C, a Frisbee (trademark), wall A, and wall B are prepared as objects which may be located in the virtual three-dimensional space. In this embodiment, a dog located in the virtual three-dimensional space autonomically moves in the virtual three-dimensional space in accordance with a predetermined automatic control algorithm as if the dog moved at its own will.

As shown in FIG. 6, the object information 43 for dog A includes shape data, texture data, location coordinates 51, state data 52, and collision determination area data 53.

The shape data represents the shape of an object (dog A in this case). For example, the shape data represents coordinates of the apexes of a polygon forming the object. Texture data is image data pasted on the polygon forming the object.

The location coordinates 51 are the location coordinates of dog A in the virtual three-dimensional space, and are updated whenever necessary based on the above-described automatic control algorithm.

The state data 52 represents the state of dog A or the state around dog A. In this embodiment, the state of dog A or the state around dog A are provided as one of six states (states A through F) shown in FIG. 7. The state data 52 is also updated whenever necessary based on the above-described automatic control algorithm, like the location coordinates 51.

The collision determination area data 53 represents the position and the size of a collision determination area which is set for dog A in order to determine whether dog A has contacted another object or not. In this embodiment, collision determination processing regarding dogs A through dogs C is performed using spherical collision determination areas. Accordingly, as the collision determination area data 53, only the coordinates of the center and the radius of the sphere used as the collision determination area of dog A need to be stored.

Regarding dogs B and C, substantially the same information is stored as the object information 43.

Regarding the Frisbee (trademark), the object information 43 includes shape data, texture data, location coordinates, and collision determination area data. The shape data, the texture data, and the location coordinates are substantially the same as those for the dogs. A collision determination area of the Frisbee (trademark) may have any shape, but in this embodiment, is disc-shaped. As the collision determination area data of the Frisbee (trademark), the position and the shape of the disc-shaped collision determination area are stored. The shape data itself of the Frisbee (trademark) may be used as the collision determination area data.

Regarding walls A and B, substantially the same information as that of the Frisbee (trademark) is stored as the object information 43.

The collision determination area table 44 shown in FIG. 3 is referred to in order to determine a collision determination area to be set for each dog. The collision determination area table 44 is shown in FIG. 7 in detail.

As shown in FIG. 7, the collision determination area table 44 defines the center position and the radius of the collision determination area for each of states A through F.

Figure 8A:
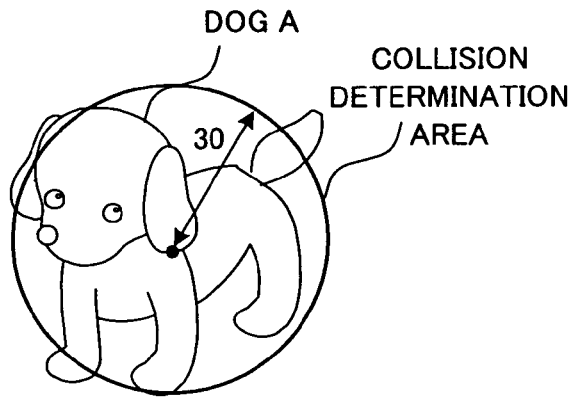
FIG. 8A shows an example of how a collision determination area is set in the state where the dog is on all fours.

For example, for state A (in which the dog is on all fours), a sphere shown in FIG. 8A having the center thereof at the chest of the dog and having a radius of 30 is provided as the collision determination area.

Figure 8B:
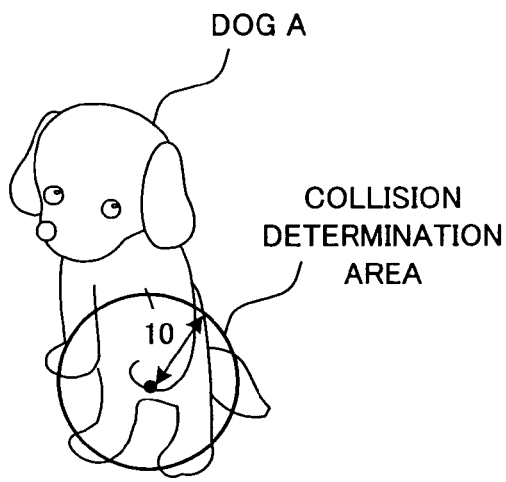
FIG. 8B shows an example of how a collision determination area is set in the state where the dog is standing.

For state B (in which the dog is standing), a sphere shown in FIG. 8B having the center thereof at the hip of the dog and having a radius of 10 is provided as the collision determination area. As can be appreciated from this, the size of the collision determination area is smaller and the position of the collision determination area is closer to the feet of the dog when the dog is standing than when the dog is on all fours. With such an arrangement, the other dogs can approach within an appropriate distance from the standing dog, and the dogs appear to move naturally.

Figure 8C:
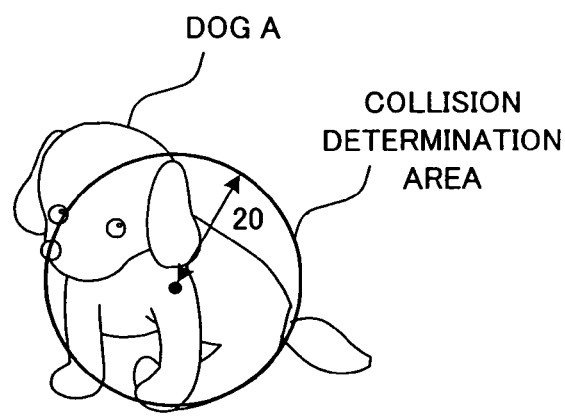
FIG. 8C shows an example of how a collision determination area is set in the state where the dog is sitting.

For state C (in which the dog is sitting), a sphere shown in FIG. 8C having the center thereof at the chest of the dog and having a radius of 20 is provided as the collision determination area. As can be appreciated from this, the size of the collision determination area is smaller when the dog is sitting than when the dog is on all fours. With such an arrangement, the other dogs can approach within an appropriate distance from the sitting dog, and the dogs appear to move naturally.

Figure 8D:
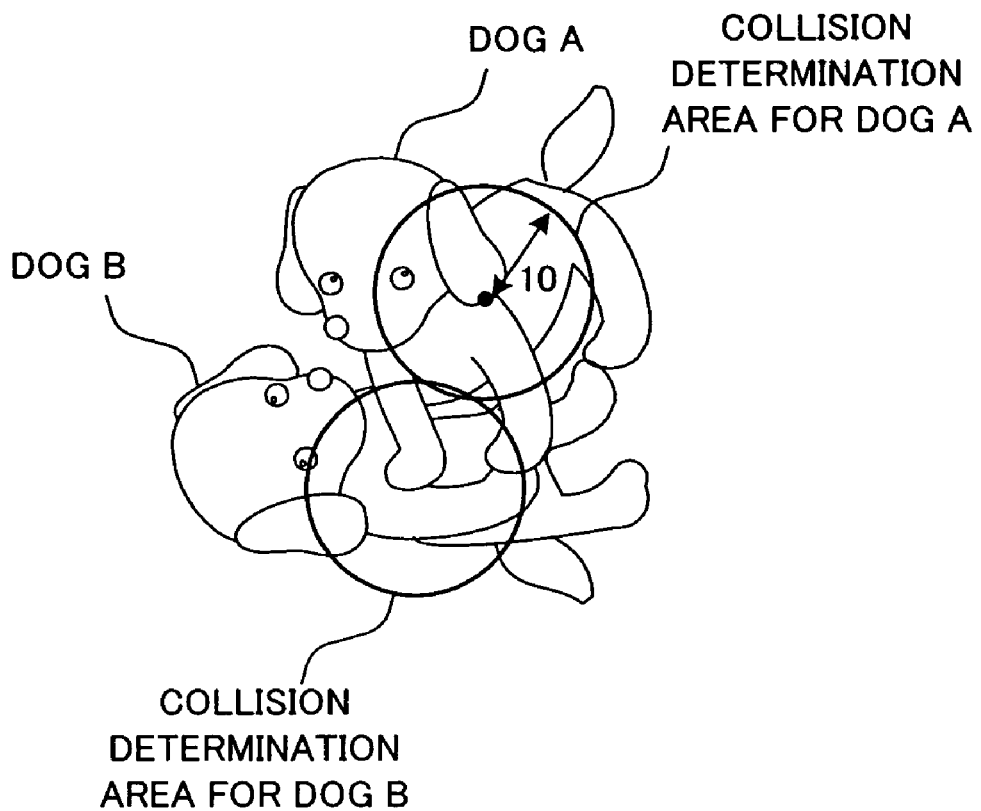
FIG. 8D shows an example of how a collision determination area is set in the state where the dog is trying to fawn with another dog.

For state D (in which the dog is trying to fawn with another dog), a sphere shown in FIG. 8D having the center thereof at the chest of the dog and having a radius of 10 is provided as the collision determination area. As can be appreciated from this, the size of the collision determination area is smaller when the dog is trying to fawn with another dog (i.e., trying to approach the another dog closer than usual) than when the dog is on all fours. With such an arrangement, the dog can approach quite close to the another dog such that the two dogs appear to the player to fawn with each other. Thus, the dogs appear to move naturally.

Figure 8E:
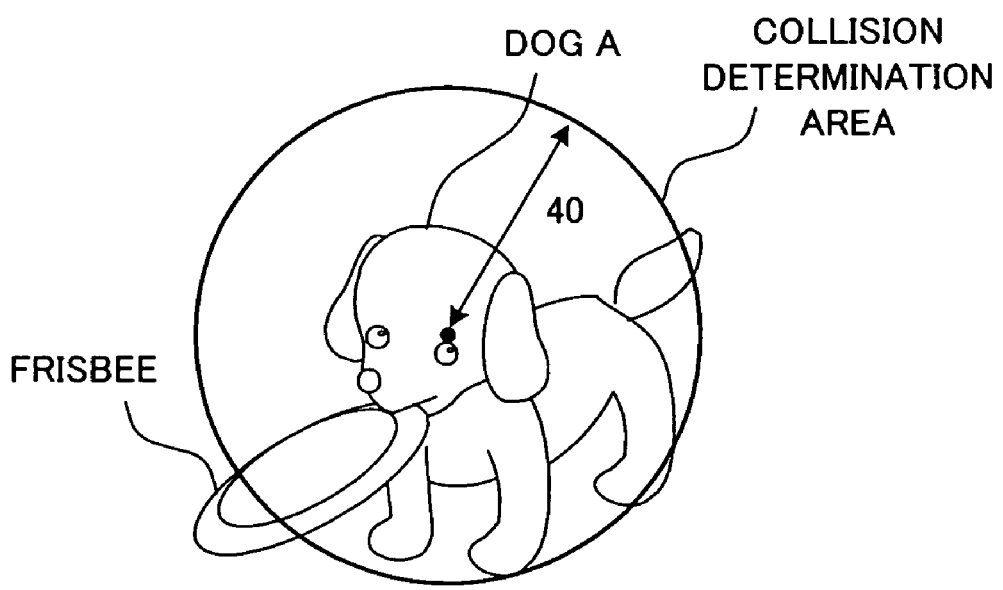
FIG. 8E shows an example of how a collision determination area is set in the state where the dog is holding a Frisbee (trademark) in his mouth.

For state E (in which the dog is holding the Frisbee (trademark) in his mouth), a sphere shown in FIG. 8E having the center thereof at the head of the dog and having a radius of 40 is provided as the collision determination area. With such an arrangement, it is not necessary to perform two types of collision determination, i.e., a determination on whether or not the Frisbee and dog B have collided against each other and a determination on whether or not dog A and dog B have collided against each other. It is only necessary to perform the latter. Therefore, the amount of calculations required for the collision determination can be reduced.

Figure 8F:
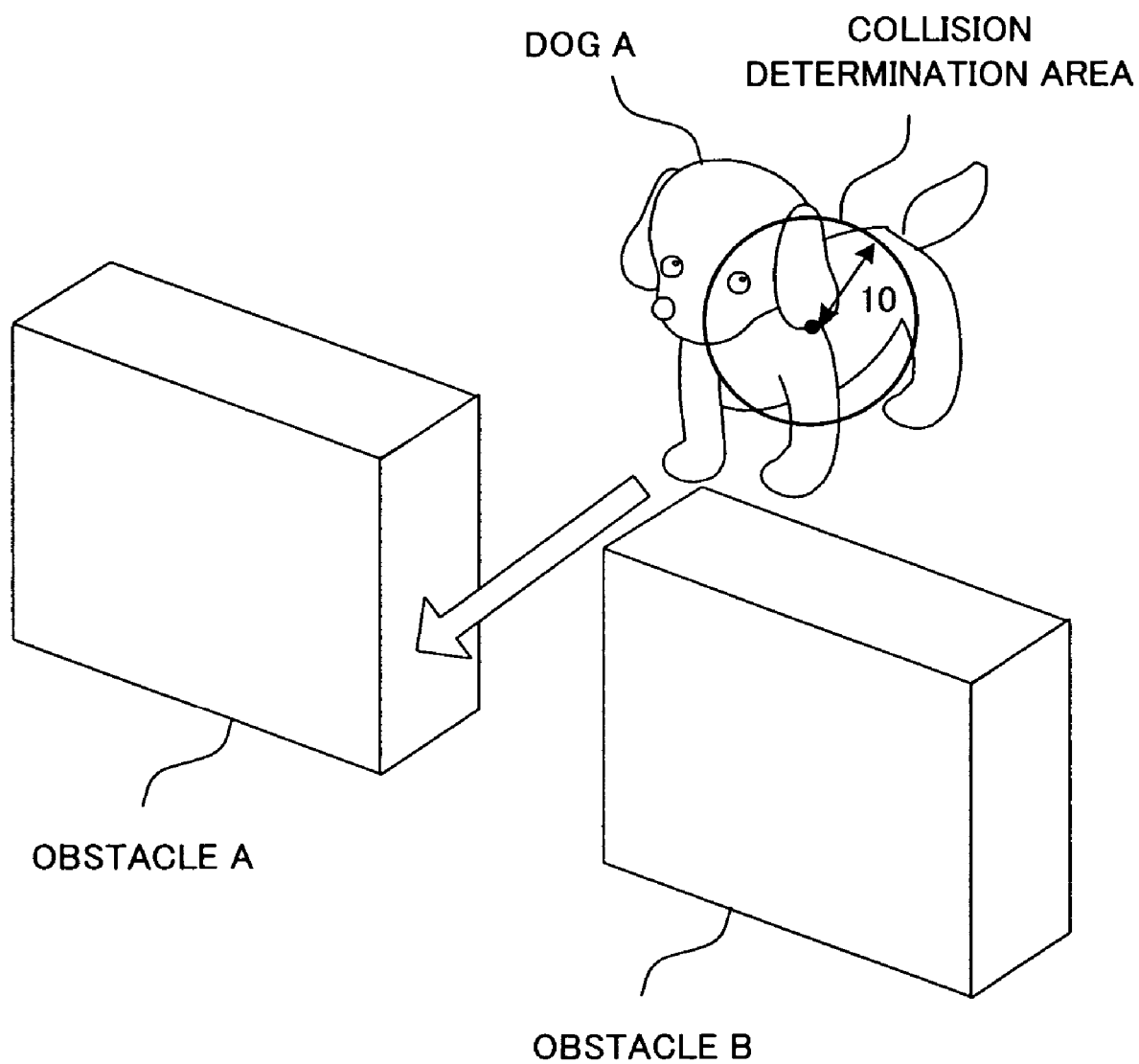
FIG. 8F shows an example of how a collision determination area is set in the state where the dog is trying to pass through a narrow passage.

For state F (in which the dog is approaching a narrow passage), a sphere shown in FIG. 8F having the center thereof at the chest of the dog and having a radius of 10 is provided as the collision determination area. With such an arrangement, an unnatural-looking situation, in which the dog is stuck before the passage and stops moving although the dog appears to be able to pass through the passage, can be avoided.

Hereinafter, with reference to the flowcharts in FIG. 9 and FIG. 10, the processing of the CPU core 21 based on the game program 41 will be described.

Figure 9:
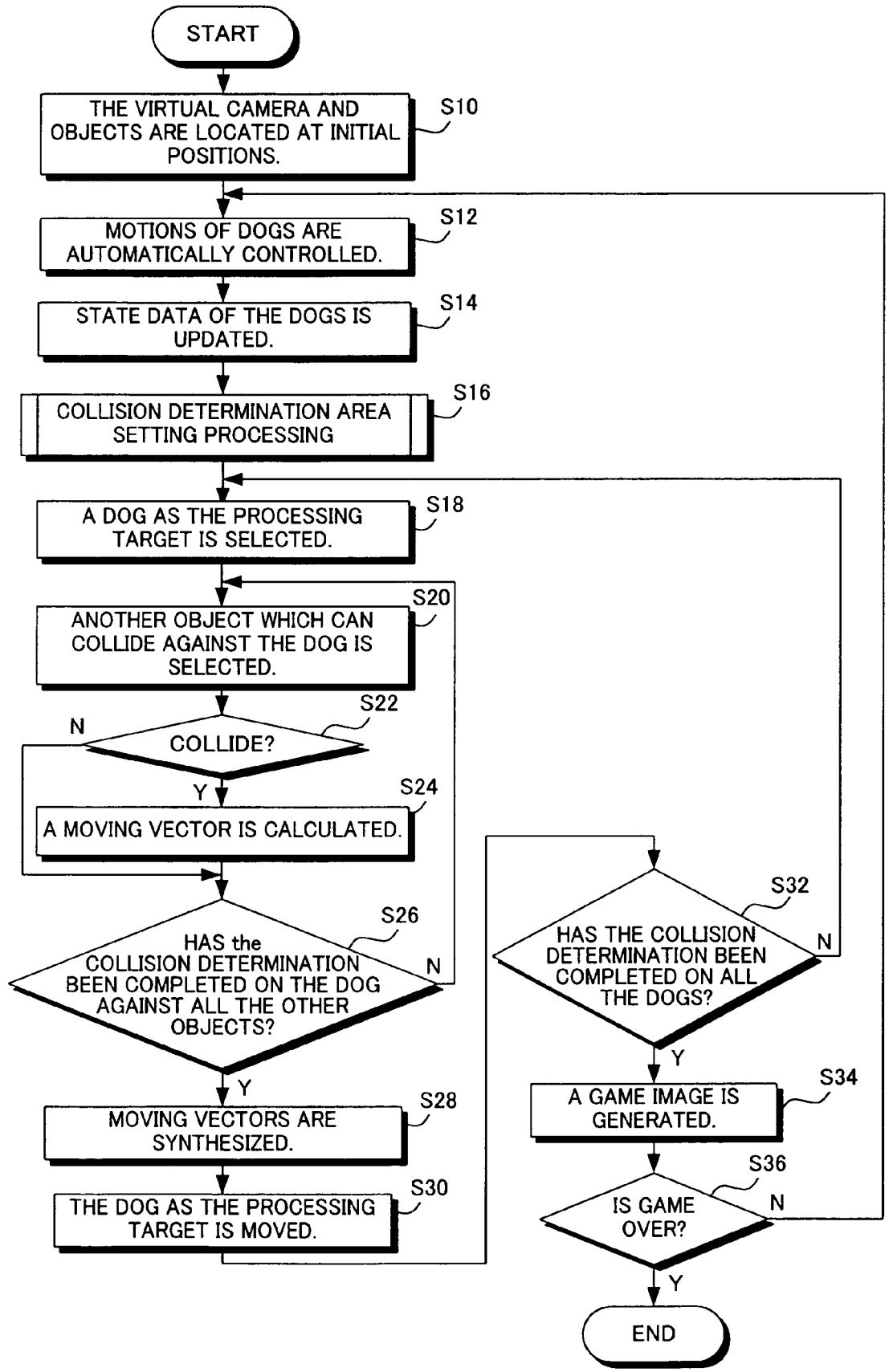
FIG. 9 is a flowchart showing processing performed by the game apparatus.

In FIG. 9, when the execution of the game program 41 is started, the CPU core 21 locates the virtual camera and the objects at initial positions in step S10.

In step S12, a motion of each dog (action pattern) is determined in accordance with a predetermined automatic control algorithm. The position (location coordinates 51) and the posture of each dog are updated whenever necessary in accordance with the determined motion.

In step S14, the state of each dog is determined in accordance with the posture of the dog at that point (on all fours, standing, sitting, or holding the Frisbee (trademark) in his mouth) or the action pattern determined based on the automatic control algorithm (trying to fawn with another dog, or trying to pass through a narrow passage). Based on the determination result, the state data 52 in the RAM 24 is updated.

In step S16, a collision determination area is set based on the state of each dog determined in step S14. Hereinafter, with reference to FIG. 10, the collision determination area setting processing will be described in detail.

Figure 10:
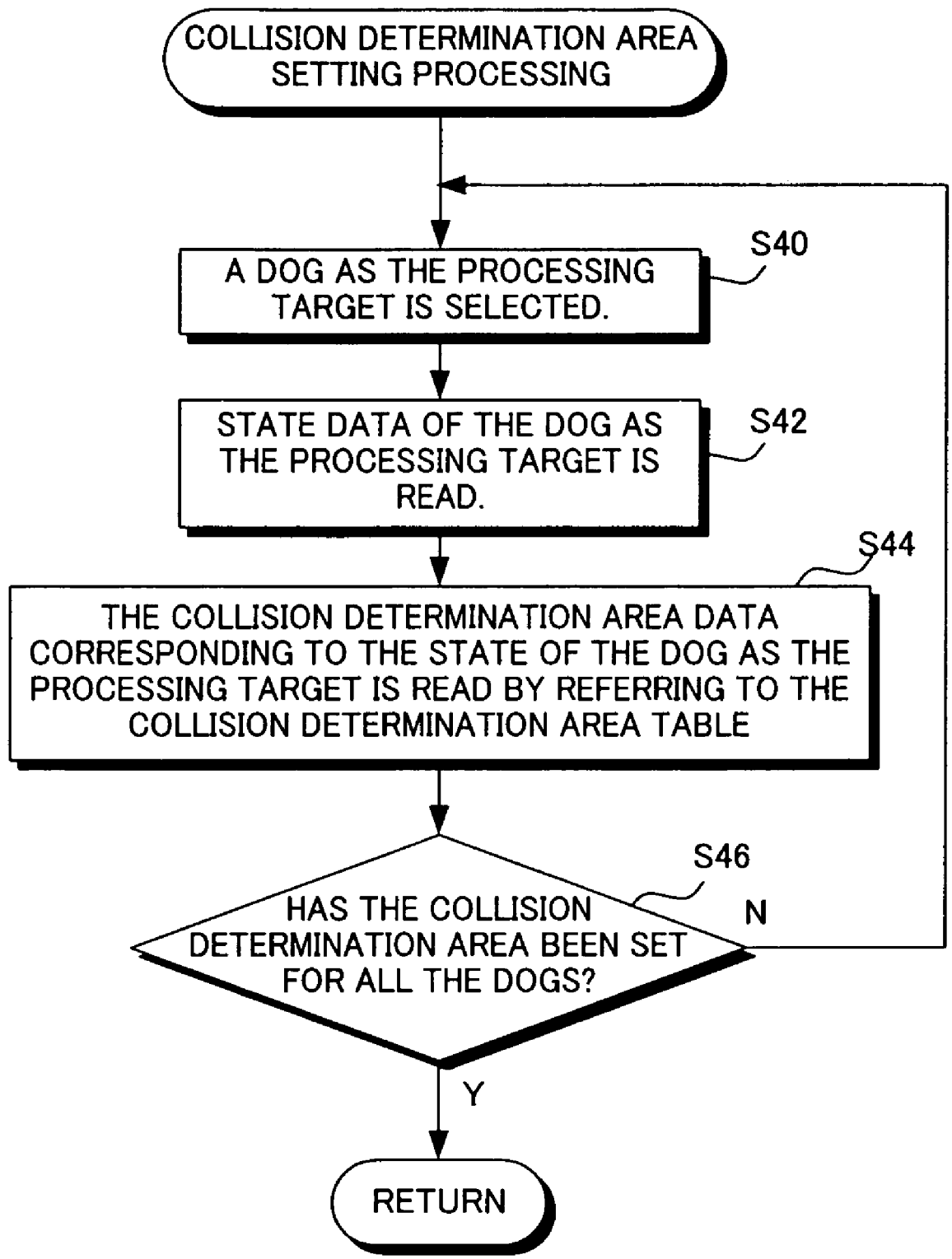
FIG. 10 is a flowchart showing the details of collision determination area setting processing.

In FIG. 10, when the collision determination area setting processing is started, the CPU core 21 selects a dog as the target for which a collision determination area is to be set in step S40. In this embodiment, dog A is selected as the target.

In step S42, the state data 52 of dog A as the target is read from the RAM 24.

In step S44, the collision determination area table 44 shown in FIG. 7 stored in the RAM 24 is referred to, and as a result, the center position and the radius of the collision determination area corresponding to the state data 52 which was read in step S42 are obtained. Based on the center position and the radius obtained, the collision determination area data 53 for dog A is updated. The center position is defined as the position relative to the dog in FIG. 7, whereas the center of the collision determination area data is stored in the RAM 24 in the form of the coordinates in the world coordinate system. Therefore, in step S44, the coordinates of the center of the collision determination area are converted into the coordinates in the world coordinate system.

In step S46, it is determined whether or not the collision determination areas have been set for dogs A through C. When the collision determination areas have been set for all the dogs, the collision determination area setting processing is terminated. The procedure goes to step S18 in FIG. 9. When there is at least one dog for which the collision determination area has not been set, the processing returns to step S40, and the above-described processing is performed for such a dog. As a result, the collision determination area data 53 for all the dogs in the RAM 24 is updated.

In step S18 shown in FIG. 9, a dog as a target of collision determination processing is selected. In this embodiment, dog A is selected as the target.

In step S20, from all the objects except for dog A, one object is selected as the target of determination on collision against dog A. In other words, it will be determined whether dog A has collided against such an object or not in the collision determination processing. In this embodiment, dog B is selected as the target.

Figure 11:
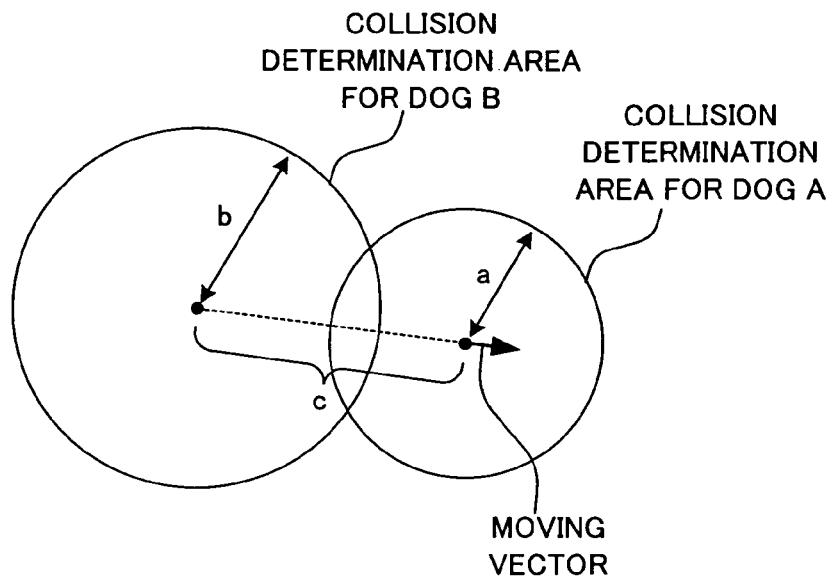
FIG. 11 shows a collision determination method and a method for calculating a moving vector.

In step S22, it is determined whether or not the object selected in step S18 (dog A in this embodiment) and the object selected in step S20 (dog B in this embodiment) have collided against each other. Specifically, this determination is performed as follows. The collision determination area data of dog A and the collision determination area data of dog B stored in the RAM 24 are referred to, and it is determined whether or not the collision determination area for dog A and the collision determination area for dog B overlap each other (i.e., whether or not the areas are connected to each other), using a predetermined collision determination formula. For example, as shown in FIG. 11, the radius of the collision determination area for dog A is "a", the radius of the collision determination area for dog B is "b", and the distance between the center of the collision determination area for dog A and the center of the collision determination area for dog B is "c". When $a+b>c$, it is determined that dog A and dog B have collided against each other. When it is determined that the object selected in step S18 (dog A in this embodiment) and the object selected in step S20 (dog B in this embodiment) have collided against each other, the procedure goes to step S24. When it is determined that the dogs did not collide against each other, the procedure goes to step S26.

In step S24, a moving vector is calculated for moving the object selected in step S18 (dog A in this embodiment) to a position at which the collision determination area for the object selected in step S18 (dog A in this embodiment) and the collision determination area for the object selected in step S20 (dog B in this embodiment) do not overlap each other. For example, when the collision determination area for dog A and the collision determination area for dog B are at the positional relationship shown in FIG. 11, the moving vector of dog A is directed from the center of the collision determination area for dog B toward the center of the collision determination area for dog A and has a size of $a+b-c$. A moving vector calculated in this manner is temporarily stored in an appropriate storage area in the RAM 24.

Figure 12:
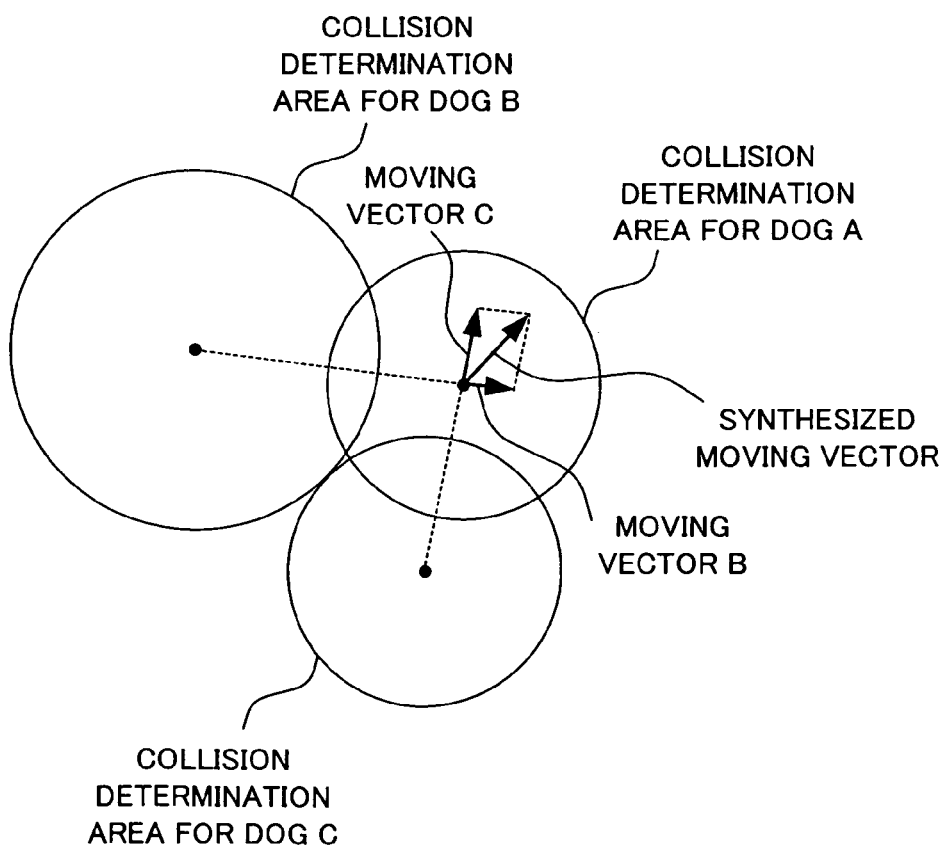
FIG. 12 shows a method for synthesizing moving vectors.

In step S26, it is determined whether or not the collision determination on dog A against all the other objects (all the objects except for dog A in this embodiment) has been completed. When completed, the procedure goes to step S28. When not, the procedure returns to step S20, and the above-described processing is performed for the object(s) on which the collision determination has not be completed. In this embodiment, during the repetition of steps S20 through S24, as shown in FIG. 12, it is detected that the collision determination area for dog A and the collision determination area for dog C overlap each other.

In the case where, as a result of repeating steps S20 through S24, a plurality of moving vectors are calculated in step S24, the moving vectors are synthesized in step S28. For example, in the case of FIG. 12, moving vector B for avoiding the collision determination area for dog A and the collision determination area for dog B from overlapping each other, and moving vector C for avoiding the collision determination area for dog A and the collision determination area for dog C from overlapping each other, are synthesized to calculate a moving vector (synthesized moving vector) which represents the direction in which and the amount by which dog A needs to be moved.

In step S30, the location coordinates 51 of the object selected in step S18 (dog A in this embodiment) and the moving vector synthesized in step S28 are added together. As a result, the object (dog A) is moved to a position at which dog A does not collide against any other object. In the case where, as a result of repeating steps S20 through S24, only one moving vector is calculated in step S24, the moving vector is used to update the location coordinates 51. In the case where no moving vector is calculated in step S24, it is not necessary to update the location coordinates 51.

In step S32, it is determined whether or not the collision determination processing has been completed for dogs A through C (i.e., whether or not all the dogs have been selected as the target of the collision determination processing in step S18). When completed, the procedure goes to step S34. When not, steps S18 through S30 are repeated for the dog(s) for which the collision determination has not been completed.

In step S34, a game image as shown in FIG. 5 is generated based on the location coordinates 51 of each dog updated in step S30. The game image generated in step S34 is temporarily stored in a frame buffer (not shown) and then is displayed on the second LCD 12 at a predetermined timing.

In step S36, it is determined whether or not the player has instructed to terminate the game. Steps S12 through S36 are repeated at a period of, for example, 60/1 second until the player instructs to terminate the game.

As described above, according to the present invention, since spherical collision determination areas are used to perform a collision determination, the amount of calculations required for the collision determination is significantly reduced. Since the size and the position of the sphere change appropriately in accordance with the state of the dogs or the state around the dogs, the dogs move more naturally.

In this embodiment, the collision determination on objects in a virtual three-dimensional space is described. The present invention is not limited to this and is applicable to the collision determination on objects in a virtual two-dimensional space.

In this embodiment, one sphere is set as a collision determination area of one object. The present invention is not limited to this. A plurality of spheres may be set as collision determination areas of one object, and the size and/or the position of at least one of the spheres may be changed in accordance with the state of, or the state around, the object. A collision determination area is not limited to a sphere, and may be of any shape which is simpler than the shape of the object. Preferable shapes of a collision determination area other than a sphere include an ellipse, rectangle parallelepiped, and cylinder.

In this embodiment, the position or the size of the collision determination area varies for each of six states (states A through F) shown in FIG. 7. The present invention is not limited to this. For example, when setting a collision determination area of an object (for example, a first object), the position or the size of the collision determination area may be changed in accordance with the current position of the first object (for example, in the case of FIG. 8F, in accordance with whether or not dog A has entered an area in the vicinity of the passage), or in accordance with the positional relationship between the first object and another object (for example, in the case of FIG. 8F, in accordance with whether or not dog A has approached both of obstacle A and obstacle B by a certain distance or greater). The collision determination area may be changed in accordance with a temperature in the vicinity of the first object (a temperature virtually set in the virtual three-dimensional space).

In this embodiment, as shown in FIG. 7, the size of a collision determination area for each state is defined numerically. The present invention is not limited to this. The size of a collision determination area may be defined by a function. For example, the size of a collision determination area may be changed in proportion to the distance from the ground to the top of the head of the dog. This is also applicable to the center position of a collision determination area.

In this embodiment, as shown in FIG. 7, the center position and the size of a collision determination area for each state are defined by actual values. The present invention is not limited to this. For example, the collision determination area for the state in which the dog is on all fours (state A in FIG. 7) may be set as a reference collision determination area. In this case, the collision determination areas for the other states may be set using a collision determination area table, which defines the offset direction and offset amount of the center position of each collision determination area and the difference in size of each collision determination area with respect to the reference collision determination area. In this case, for example, the radius of the collision determination area for state B in FIG. 7 is defined as "−20".

While the invention has been described in detail, the foregoing description is in all aspects illustrative and not restrictive. It is understood that numerous other modifications and variations can be devised without departing from the scope of the invention.

What is claimed is:

1. A computer-readable storage medium having a collision determination program stored thereon for determining whether or not a first object and a second object have collided against each other in a virtual space displayed on a display, the collision determination program causing a computer to execute:

an updating step of updating position information of the first object or the second object stored in a storage device;

a first setting step of setting a collision determination area for the first object, the collision determination area having a shape different from the shape of the first object and having a size or a position in accordance with a state of the first object or a state around the first object, wherein the size or the position of the collision determination area is selected from a group of predefined sizes or predetermined positions for the first object, wherein each of the predetermined sizes or the predetermined positions for the first object corresponds to a different one of predetermined states of the first object or predetermined states around the first object, and the state of the first object or the state around the first object is one of the predetermined states;

a second setting step of setting a collision determination area for the second object; and a collision determination step of determining whether or not the first object and the second object have collided against each other by determining whether or not the collision determination area set for the first object in the first setting step and the collision determination area set for the second object in the second setting step overlap each other.

2. A computer-readable storage medium according to claim 1, wherein the collision determination area set for the first object in the first setting step has a shape simpler than the shape of the first object.

3. A computer-readable storage medium according to claim 1, wherein the collision determination area set for the first object in the first setting step is formed of one sphere.

4. A computer-readable storage medium according to claim 1, wherein the collision determination area set for the first object in the first setting step is different in the size or the position in accordance with whether the first object and a third object are combined.

5. A computer-readable storage medium according to claim 4, wherein the collision determination area set for the first object in the first setting step includes at least a part of the third object when the first object and the third object are combined with each other.

6. A computer-readable storage medium according to claim 1, wherein the collision determination area selected for the first object in the first setting step is smaller when the first object is permitted to contact another object than when the first object is not permitted to contact another object.

7. A computer-readable storage medium according to claim 1, wherein the collision determination area selected for the first object in the first setting step is different in the size or the position in accordance with a current position of the first object or the positional relationship between the first object and another object.

8. A computer-readable storage medium according to claim 1, wherein the first setting step includes
 a step of reading a reference collision determination area for the first object which is set with a predetermined size and at a predetermined position from the storage device, and
 a step of changing the size or the position of the read reference collision determination area in accordance with the state of the first object or the state around the first object.

9. A computer-readable storage medium according to claim 1, wherein the selection of the size or the position from the group is performed by referring to a collision determination area table which defines the size and the position of a collision determination area for each of predetermined states of the first object or each of conceivable states around the first object.

10. A computer-readable storage medium according to claim 1, wherein the collision determination program further causes the computer to execute:
 a moving step of, when the first step and the second step are determined to have collided against each other in the collision determination step, further updating the position information of the first object or the second object stored in the storage device, thereby moving at least one of the first object and the second object to a position at which the collision determination area for the first object and the collision determination area for the second object do not overlap each other; and
 an outputting step of generating an image including the first object and the second object by referring to the position information of the first object or the second object stored in the storage device, and outputting the image to the display.

11. A collision determination apparatus for determining whether or not a first object and a second object have collided against each other in a virtual space displayed by display, the collision determination apparatus comprising:
 the display;
 a storage device storing position information of at least the first object and the second object;
 updating means for updating the position information of the first object or the second object stored in the storage device;
 first setting means for setting a collision determination area for the first object, the collision determination area having a shape different from the shape of the first object and having a size or a position in accordance with a state of the first object or a state around the first object, wherein the size or the position of the collision determination area is selected from a group of predefined sizes or predetermined positions for the first object, wherein each of the predetermined sizes or predetermined positions for the first object corresponds to a different one of predetermined states of the first object or states around the first object and the state of the first object or the state around the first object is one of the predetermined states;
 second setting means for setting a collision determination area for the second object; and
 collision determination means for determining whether or not the first object and the second object have collided against each other by determining whether or not the collision determination area set for the first object and the collision determination area set for the second object overlap each other.

12. A computer-readable storage medium having a collision determination program stored thereon for determining whether or not a first object and a second object have collided against each other in a virtual space displayed on a display, the collision determination program causing a computer to execute:
 an updating step of updating position information of the first object or the second object stored in a storage device;
 a first setting step of setting a collision determination area for the first object, the collision determination area having a shape different from the shape of the first object and having a size or a position different in accordance with a posture of the first object or an action pattern of the first object, wherein the size the position of the collision determination area is selected from a group of predefined sizes or predetermined positions for the first object, wherein each of the predetermined sizes or predetermined positions for the first object corresponds to a different one of a predetermined postures of the first object or a predetermined action pattern of the first object, and the posture of the first object or the action pattern of first object is one of the predetermined postures or action pattern;
 a second setting step of setting a collision determination area for the second object; and
 a collision determination step of determining whether or not the first object and the second object have collided against each other by determining whether or not the collision determination area set for the first object in the first setting step and the collision determination area set for the second object in the second setting step overlap each other.

* * * * *